United States Patent
Panopoulos

(10) Patent No.: US 7,549,228 B2
(45) Date of Patent: Jun. 23, 2009

(54) FRUIT PEELING PACKAGING INNOVATION WITH AN OPTIONAL CUTTING EDGE, OPTIONAL SPOON, OPTIONAL FORK, OR OPTIONAL HYBRID SPOON-FORK

(76) Inventor: Peter John Panopoulos, 9220 S. 87th Ct., Hickory Hills, IL (US) 60457

( * ) Notice: Subject to any disclaimer, the term of this patent is extended or adjusted under 35 U.S.C. 154(b) by 167 days.

(21) Appl. No.: 11/298,335

(22) Filed: Dec. 8, 2005

(65) Prior Publication Data
US 2006/0226165 A1  Oct. 12, 2006

Related U.S. Application Data

(60) Provisional application No. 60/669,626, filed on Apr. 8, 2005, provisional application No. 60/672,299, filed on Apr. 18, 2005.

(51) Int. Cl.
*B26B 11/00* (2006.01)
(52) U.S. Cl. .............. 30/123; 7/112; 7/113; 7/158; 30/142; 30/147; 30/148; 30/149; 30/150; D7/643
(58) Field of Classification Search .......... 7/112, 7/113, 158; 30/123, 142, 147, 148, 149, 30/150, 322, 324; D7/642, 643, 644, 649, D7/650, 653; 426/87
See application file for complete search history.

(56) References Cited

U.S. PATENT DOCUMENTS

| | | | | | |
|---|---|---|---|---|---|
| 3,056,200 | A | * | 10/1962 | Williams | 30/148 |
| 3,828,999 | A | * | 8/1974 | Humphrey | 229/401 |
| 3,908,887 | A | * | 9/1975 | Leto | 220/574 |
| 4,535,538 | A | * | 8/1985 | Nelson | 30/147 |
| 4,826,033 | A | * | 5/1989 | Satoh | 30/322 |
| 5,415,309 | A | * | 5/1995 | Wang | 220/4.27 |
| 5,542,181 | A | * | 8/1996 | Gaylord | 30/148 |
| 2006/0265293 | A1 | * | 11/2006 | Bengyak | 705/28 |

* cited by examiner

*Primary Examiner*—Timothy V Eley
(74) *Attorney, Agent, or Firm*—Justin Lampel

(57) ABSTRACT

A fruit peeling packaging innovation is provided to allow consumers to start to peel a fruit by pulling a glued tab off a fruit. By pulling the tab off a fruit a consumer rips off that portion of the peel that the tab is glued to. Various models can have tabs with an optional cutting edge where the consumer can use the cutting edge to further, peel, clean, and or cut the fruit and eat it. The device includes a tab made of plastic, metal or other material, a tab with a handle, an optional cutting edge, and or an optional spoon, fork, or an optional hybrid spoon-fork. The tab can be made out of a food grade plastic, metal or other moldable material. Further, the tab or handle can be molded or printed thereon to include advertising or slogans and can be applied to any kind of fruit.

27 Claims, 3 Drawing Sheets

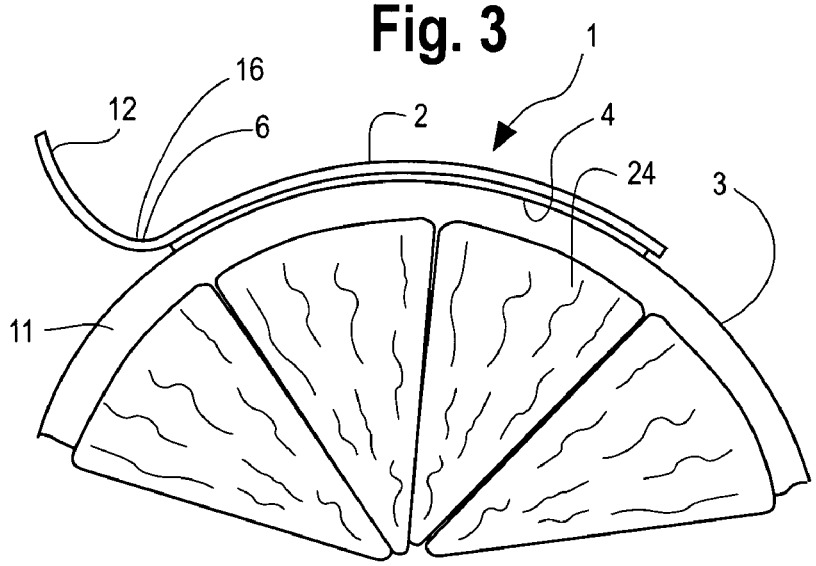
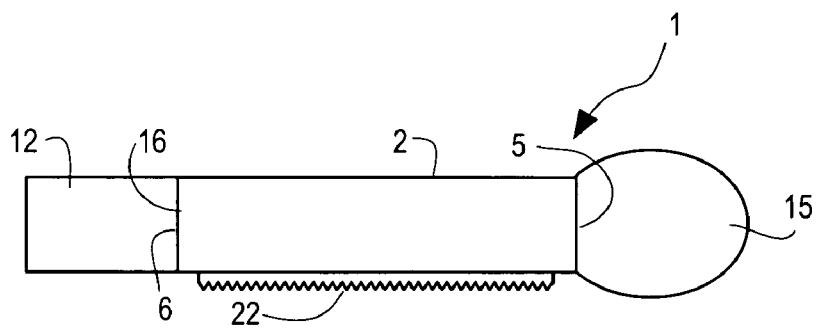
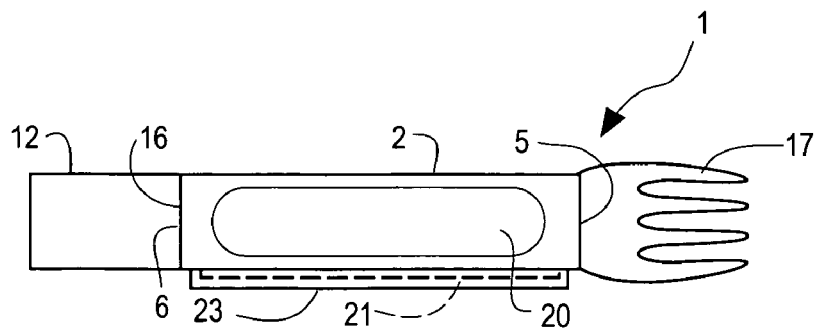
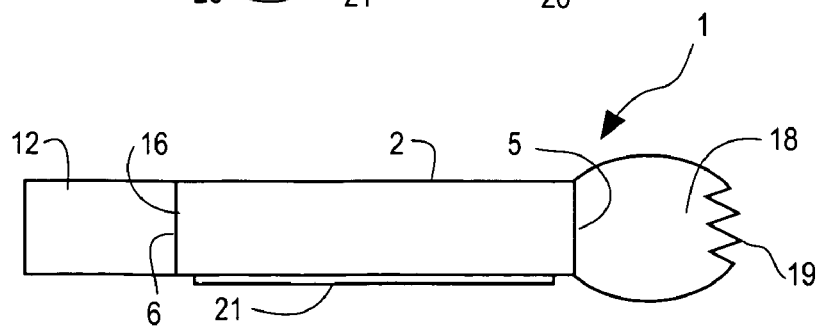

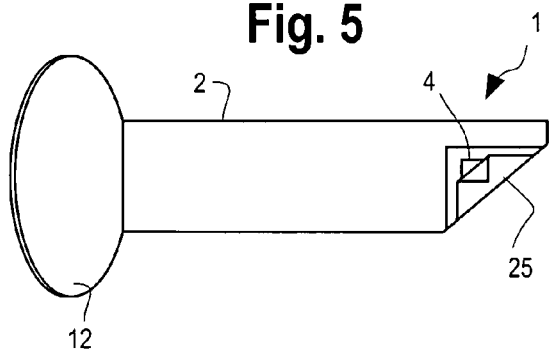
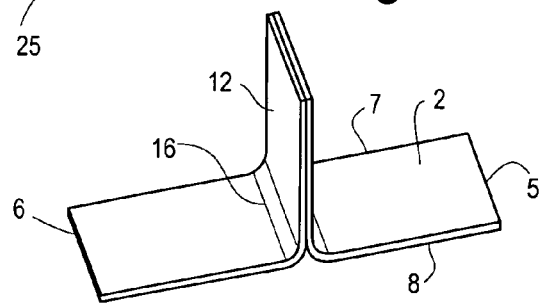
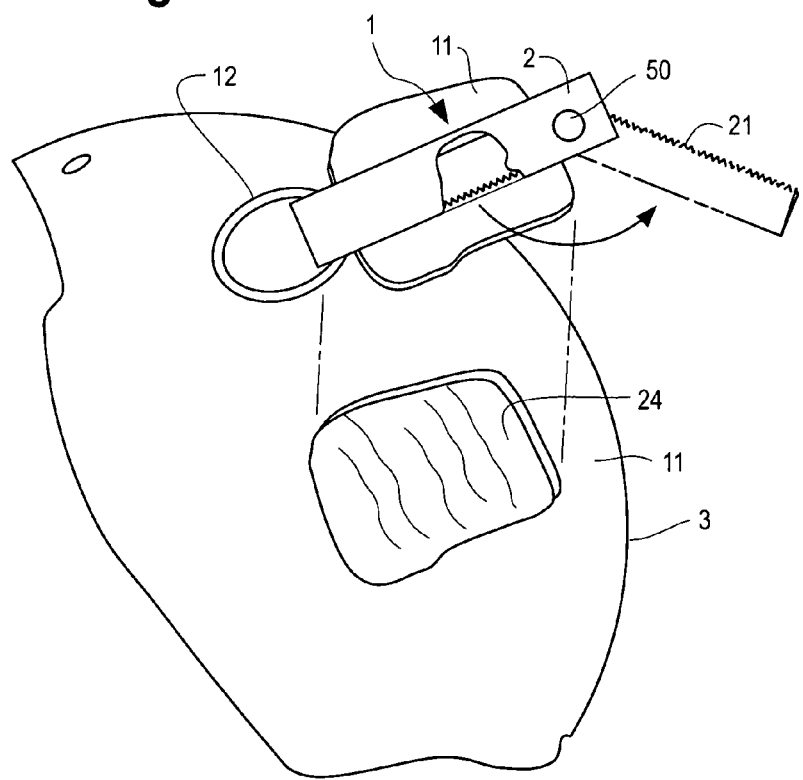
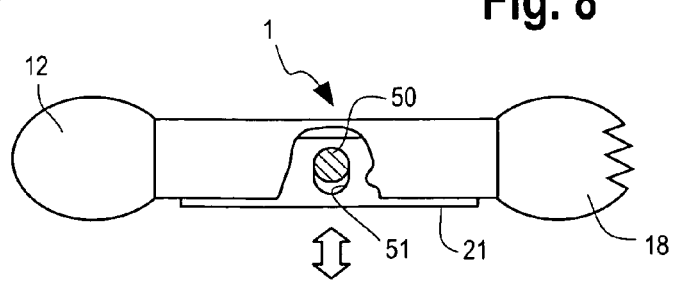

FRUIT PEELING PACKAGING INNOVATION WITH AN OPTIONAL CUTTING EDGE, OPTIONAL SPOON, OPTIONAL FORK, OR OPTIONAL HYBRID SPOON-FORK

CROSS REFERENCE TO RELATED APPLICATIONS

This application is related to and claims the benefit of the filing date of provisional application Ser. No. 60/669,626 filed on Apr. 8, 2005 and it is also related to and claims the benefit of the filing date of provisional application Ser. No. 60/672,299 filed on Apr. 18, 2005.

BACKGROUND OF THE INVENTION

Field of the Invention

The present invention relates generally to fruit peeling packaging and more specifically it relates to a fruit peeling packaging innovation for providing utility to allow consumers to easily immediately peel a fruit by pulling a tab off of a fruit after they purchase it. The fruit can still be washed, and by pulling the tab off the fruit the consumer rips off that portion of the peel that the tab was glued to.

Further, with models having tabs having an optional cutting edge, the consumer can use the cutting edge to further peel the fruit, clean the fruit, remove seeds, cut the fruit, shape the fruit, scoop the fruit out and also use the optional spoon or optional fork or the optional hybrid spoon/fork, or "spork" to eat it and or to further use the spoon, fork or spork, as they would use the optional cutting edge, to enjoy their fruit.

It can be appreciated that fruit packaging has been in use for years. Typically, fruit packaging is comprised of packaging concepts to deliver fruit to consumers including plastic baskets or plastic bagging, cartons, bushels, or other means, where citrus or other fresh fruit products are placed for delivery to consumers.

The main problem with conventional fruit packaging products are that they make no provision for providing utility to provide a method where a consumer may use what is used by the packager whereby a consumer may pull a tab off the fruit to assist the peeling process to begin the peeling process so the consumer may then completely peel the fruit manually by hand and eat it.

Another problem with conventional fruit packaging is that they make no provision for providing utility to provide a method where a consumer may use what is used by the packager whereby a consumer may pull a tab off the fruit to peel the fruit and eat it through means of a tab ripping the peel off the fruit because it is glued to the fruit with food-safe glue whereby the action of pulling the tab will rip off the peel underneath the tab to allow a consumer to start to clean a fruit from its peel.

Another problem with conventional fruit packaging is that they make no provision for providing utility to provide a method whereby a consumer may use what is used by the packager whereby a consumer may pull a tab off the fruit to peel the fruit and eat it further utilizing the same tab whereby such a tab would have a cutting edge to further peel the fruit, cut the fruit, or to utilize an optional spoon or fork or optional hybrid spoon/fork containing a spoon with fork teeth built into the optional spoon to further eat the fruit, or as in the case of lemons to use the optional spoon, optional fork, or optional hybrid spoon/fork to squeeze lemon juice onto food.

While these devices may be suitable for the particular purpose to which they address, they are not as suitable for providing utility to allow consumers to easily immediately peel a fruit by pulling a tab off of a fruit after they purchase it. The fruit can still be washed, and by pulling the tab off the fruit the consumer rips off that portion of the peel that the tab was glued to. Further, with models having tabs having the optional cutting edge the consumer can use the cutting edge to further cut the fruit and eat it. The main problem with conventional fruit packaging is that they make no provision for providing utility to provide a method where a consumer may use what is used by the packager whereby a consumer may pull a tab off the fruit to peel the fruit and eat it.

In these respects, the fruit peeling packaging innovation according to the present invention substantially departs from the conventional concepts and designs of the prior art, and in so doing provides an apparatus primarily developed for the purpose of providing utility to allow consumers to easily immediately peel a fruit by pulling a tab off of a fruit after they purchase it. Further, with models having tabs having the optional cutting edge the consumer can use the cutting edge to further peel the fruit, clean the fruit, remove seeds, cut the fruit and eat it. Further, the consumer can use an optional spoon or optional fork on one side of the tab whereby the tab may have an optional hybrid spoon/fork with fork teeth built into it to further eat the fruit as in eating a grapefruit once a grapefruit is cut in half with the cutting edge as many people do.

SUMMARY OF THE INVENTION

In view of the foregoing disadvantages inherent in the known types of fruit packaging now present in the prior art, the present invention provides a new fruit peeling packaging innovation construction wherein the same can be utilized for providing utility to allow consumers to easily immediately peel a fruit by pulling a tab off of a fruit after they purchase it.

The general purpose of the present invention, which will be described subsequently in greater detail, is to provide a new fruit peeling packaging innovation that has many of the advantages of the fruit peeling packaging mentioned heretofore and many novel features that result in a new fruit peeling packaging innovation which is not anticipated, rendered obvious, suggested, or even implied by any of the prior art fruit packaging concepts, either alone or in any combination thereof.

To attain this, the present invention generally comprises a tab made out of plastic, metal or other material, a tab with a handle or other grasping mechanisms, an optional cutting edge on the tab, a tab made out of a food grade plastic or other moldable material, a tab that can be molded or printed on to accommodate slogans, logos or other information for advertising purposes and any kind of fruit.

The tab is preferably made from food grade plastic, metal, or other material and may be glued to a whole fresh fruit with food safe glue approved by the FDA. The tab which is made out of a food grade plastic, metal, or other material or other moldable material is applied to fruit.

Various models of the tab can be developed whereby an optional cutting edge on the tab can be included to allow a consumer to cut the fruit to eat it whereby the cutting edge can be made out of plastic material similar to the tear-off tab and or include a metal cutting blade attached or embedded into the tear-off tab.

The cutting edge can be offered in a variety of variations to include a non-moving stationary cutting edge tool built into the side of the tab. Alternatively, the cutting edge can be made mechanically functional and or be attached to the tab to have at least one blade rotate and or pivot to move into or out of a cutting position and or be concealed when not in use as in a pocket knife, and or be fashioned in similar mechanical variations as is known in the art. A yet further alternative is to have a cutting edge that can be included in the tab where the cutting edge can be initially installed in the tab and be made where it can be fashioned to be removed from the tab, used as a cutting tool, and then be discarded, and or be later reinserted into the tab for later use.

Further, an optional spoon, an optional fork, and or an optional hybrid spoon/fork, or "spork" can be provided on one side of the tab having enough rigidity to withstand eating or use pressures of eating or dealing with fruit.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings.

The invention is capable of other embodiments and of being practiced and carried out in various ways. Also, it is to be understood that the phraseology and terminology employed herein are for the purpose of the description and should not be regarded as limiting.

A primary object of the present invention is to provide a fruit peeling packaging innovation that will overcome the shortcomings of the prior art devices.

Another object is to provide a fruit peeling packaging innovation that will allow said tab to have a handle or a grasping mechanism to allow the consumer to grasp the tab to allow the consumer to rip the tab off the fruit to peel the fruit.

Another object is to provide a fruit peeling packaging innovation that will allow said tab to have an optional spoon or fork or to have said tab contain an optional hybrid spoon/fork containing a spoon with fork teeth built into or attached to one side of the tab of "x" length, "y" width, and "z" shape to allow the consumer to eat the fruit with the spoon or fork or optional hybrid spoon/fork after cutting into the fruit.

Another object of the present invention is to provide a fruit peeling packaging innovation that will allow ample space on the present invention for the printing or inclusion of advertising, slogans, logos or further information upon any portion of the present invention. Said advertising to be included upon the present invention may be carried out by printing, by molding it into the material of the product via manufacturing, by a stamping process, or another process so that the advertising is affixed to the product through a manufacturing process, by affixing decals or to include said information upon the tab for advertising purposes, or through other processes. It is understood that this advertising may be placed on the tab, on the cutting edge, on the spoon, on the fork, on the hybrid spoon/fork or "spork", on the handle, on the protective guard, or on any part of the peeler or device.

Another object of the present invention is to provide a fruit peeling packaging innovation that will allow a consumer to pull a tab off a fruit to peel the fruit and eat it further utilizing the same tab which may have an optional cutting edge to further peel, further clean the fruit, remove seeds, and or to otherwise cut or serve the fruit.

Another object of the present invention is to provide a fruit peeling packaging innovation that will allow said tab to have at least one optional cutting edge built into the tab of "X" length, "Y" width, and "Z" shape for cutting into the fruit.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 is a side view of the peeler attached to a piece of fruit.

FIG. 4A is a top view of a spoon version of the peeler.

FIG. 4B is a top view of a fork version of the peeler.

FIG. 4C is a top view of a spork version of the peeler.

FIG. 5 is a top view of the peeler wherein a portion of the bottom of the peeler is revealed showing a removable protective sheet covering the adhesive of the tab.

FIG. 6 is a perspective view of the peeler wherein the handle is located near the middle of the peeler.

FIG. 7 is a perspective view of the peeler torn off from a fruit exposing the flesh of the fruit.

FIG. 8 is a top view of the peeler showing a cutting edge on a tab that can slide into cutting position moving on an axle in a slot.

DETAILED DESCRIPTION OF THE INVENTION

Figure 1A:
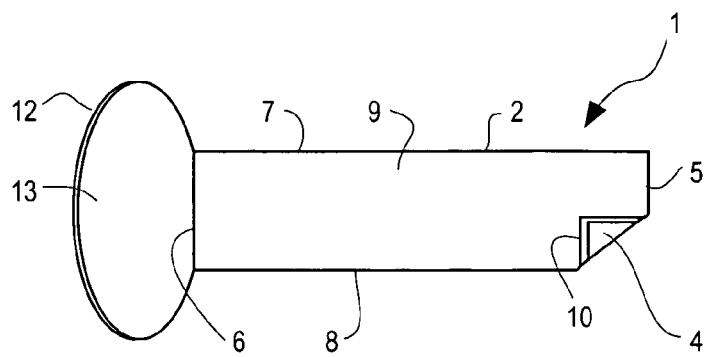
FIG. 1A is a top plan view of the peeler.

Turning now descriptively to the drawings, in which similar reference characters denote similar elements throughout the several views, the attached figures illustrate a fruit peeling packaging innovation, which comprises a tab made of plastic, metal or other material, a tab with a handle or other grasping mechanisms, an optional cutting edge on the tab, a tab made out of a food grade plastic, metal, or other moldable material, a tab that can be molded or printed on to accommodate slogans, logos or other information for advertising purposes and any kind of fruit.

Figure 2:
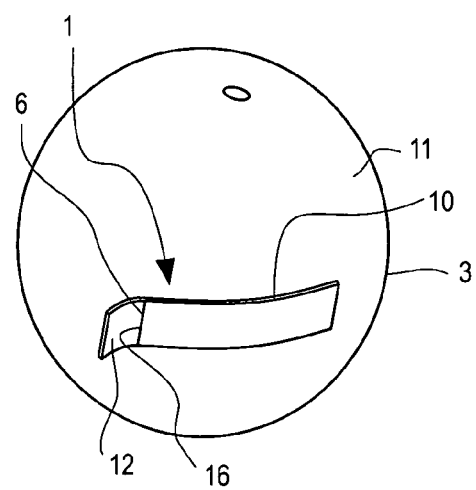
FIG. 2 is a perspective view of the peeler wherein the peeler is attached to a fruit.

Referring now to FIG. 1A, a peeler 1 is provided. The peeler 1 may have a tab 2. Preferably, the peeler 1 and/or the tab 2 and its components are made from plastic, metal or other suitable material. The tab 1 may be glued to a fruit 3 (as is shown in FIG. 2) by means of a food safe glue 4. Preferably, the peeler 1 may bend easily so as to fit the curvature of the fruit 3. The peeler 1 may be placed toward the middle of the fruit 3 and away from any stem of the fruit 3. Further, a plurality of peelers 1 may be placed around a single fruit 3, for example, so that a larger portion of the fruit 3 is covered by the peeler 1. The glue 4 is preferably approved by the Food and Drug Administration or similar agencies.

As depicted in FIG. 1A, The tab 2 may have a first end 5, a second end 6, a first side 7, a second side 8, a top 9 which may have a space 20 (as is illustrated in FIG. 4B) that may allow the manufacturer, farmer or other entity to place an advertisement or other indicia for a user's or an advertiser's purposes, and/or a bottom 10. Preferably, the glue 4 is added to the bottom 10 of the tab 2.

The first side 7 and/or the second side 8 of the tab 2 may cover only a portion of the fruit 3 or may substantially wrap around the entire fruit 3. The glue 4 may be located on a portion of the bottom 10 of the tab 2 or may cover the entire bottom 10 of the tab 2. The glue 4 may be formulated as such to create a strong enough bond between the bottom 10 of the tab 2 and the fruit 3, such that the outer surface 11 of the fruit 3 may be removed from the fruit 3 by pulling off the tab 2, even if waxes, cleansing agents, dyes, fruit gases, fruit sugars, organic material, inorganic material, fruit juices, or any other substance is applied to the fruit 3 prior to placing the tab 2 onto the fruit 3. It is also suggested that the glue 4 be approved by the Food and Drug administration and or similar agencies for food use. It is further suggested that the glue 4 be formulated so that it would not damage the fruit 3, or the appearance of the fruit 3.

Preferably, the glue 4 is made and formulated so as to withstand the possible extreme temperature changes in which it may be exposed to before and/or after being secured onto the fruit 3. In addition, it is suggested that the glue 4 should be formulated to remain effective even if the glue 4 is exposed to excessive dryness, moisture, refrigeration, freezing and/or heating and that it be fast drying. The glue 4 should also be formulated to have a bonding strength strong enough so that a portion of the outer surface 11 of the fruit 3 peels off the fruit 3 when the tab 2 of the peeler 1 is removed from the fruit 3. More specifically, the portion of the outer surface 11 of the fruit 3 which is removed from the fruit 3 after the peeler 1 is used or removed from the fruit 3 may be approximately the size of the tab 2 of the peeler 1. The force needed to remove the peeler 1 from the fruit 3 should be no more than a force capable of being produced by almost all people.

The peeler 1 may have a handle 12. The handle 12 may be secured to the tab 2 by glue 4 or any other means commonly used in the field. Alternatively, the peeler 1 may be constructed such that the handle 12 and tab 2 may be one continuous piece when manufactured.

Figure 1B:
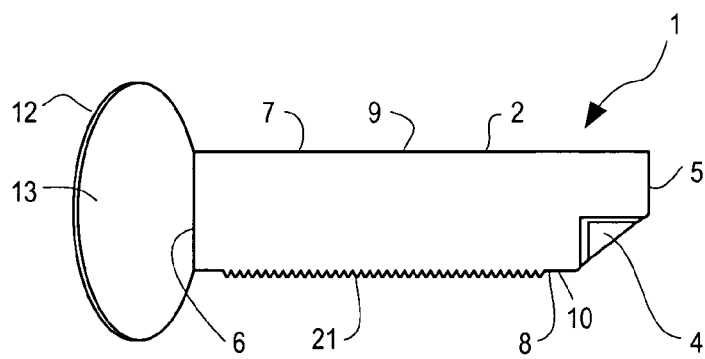
FIG. 1B is a top plan view of the peeler having a stationary cutting edge.
Figure 1C:
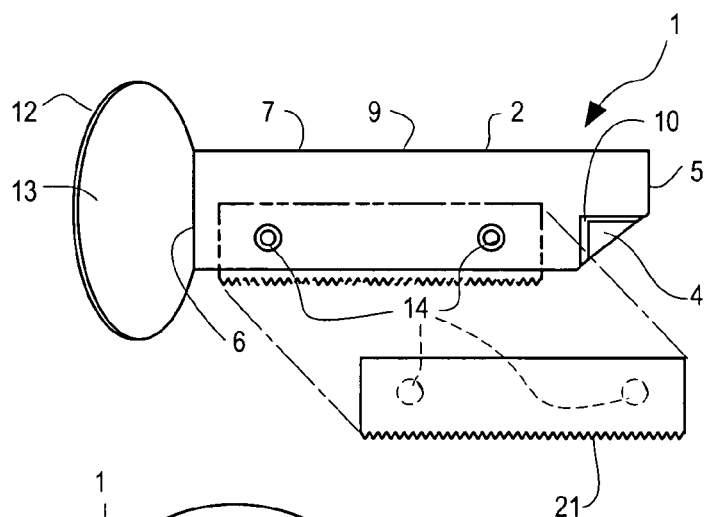
FIG. 1C is a top plan view of the peeler showing a detachable cutting edge.

Preferably, the handle 12 is secured to or near the first end 5 or second end 6 of the tab 2. More specifically, the handle 12 may begin at the first end 5 or second end 6 of the tab 2 or may overlap with a portion of the tab 2. The handle 12 may be, for example, in the shape of a ring (as Illustrated in FIG. 1). However, the handle 12 may have numerous other shapes. The tab 2 of the peeler 1 may be longer than the handle 12. The handle 12 may be a portion of the peeler 1 in which a user grasps and pulls upward when removing the tab 2 from the outer surface 11 of the fruit 3. Preferably, the handle 12 has an opening 13 which is large enough for a user to insert his/her finger or thumb. Accordingly, the diameter of the opening 13 of the handle 12 may be larger than the diameter of the fingers and or thumbs of most users. It should be understood that the diameter of the handle 12 may vary such to accommodate a user with a smaller finger/thumb or larger finger/thumb. In an alternate embodiment, a cutting edge 21 may be added to at least one side of the peeler 1 at tab 2 as is shown in FIG. 1B to assist in further peeling or cutting a fruit 3 after removing the peeler 1 or tab2 from a fruit 3. In an alternate embodiment, at least one cutting edge 21 may be fashioned to be made detachable from the peeler 1 or the tab 2 where it can be unsnapped and removed from the tab 2 from at least one attachment junction 14 and be utilized as a cutting or peeling tool, and where it then can be later discarded and or be reinserted and or snapped back into the tab at the attachment junctions 14 as is shown in FIG. 1C that secure the removable cutting edge 21 into the tab 2 of the peeler 1.

Referring now to FIG. 2, the handle 12 of the peeler 1 may lack an opening 13. More specifically, the handle 12 of the peeler 1 may simply be a portion of the tab 2 which does not have glue 4 and which extends separately without glue from the glued portion of the tab. In this embodiment, the glue 4 on the bottom 10 of the tab 2 may not be located at the first end 5 or second end 6 of the tab 2 where the handle would extend and be grasped. Further, the handle 12 may be separated from the tab 2 by, for example, a bend line 16. The bend line 16 may allow the handle 12 to bend upward, away from the fruit 3.

FIG. 3 illustrates the peeler 1 attached to a piece of fruit 3 wherein the peeler 1 is attached to the outer surface 11 of the fruit 3 via glue 4 which is located on the bottom 10 (shown in FIGS. 1A, 1B, 1C) of the tab 2 of the peeler 1. The handle 12 of the tab 2 in FIG. 3 extends upward at the bend line 16, away from the fruit 3. Having the handle 12 extend upward at the bend line 16 may allow the user to easily grasp the handle 12. Preferably, the handle 12 extends upward between a twenty and seventy degree angle, however, it should be understood that the handle 12 may extend upward at any angle with respect to the tab 2. In an embodiment, the handle 12 is also glued to the fruit 3. FIG. 3 also shows the peeler 1 glued to the fruit 3 at its outer surface 11 with the underlying flesh 24 of the fruit 3 and its outer surface 11 intact.

Alternate variations of the peeler 1 can be developed where the handle 12 is glued to the fruit 3, and still yet other variations can be developed where the handle 12 is not glued directly to the fruit 3, but rather is directly connected to the tab 2 at various positions, further still the handle itself can be the tab 2 in an alternate description which can be lifted off the fruit 3 to tear the peel or the fruit's outer surface 11.

Referring now to FIGS. 4A, 4B, and 4C, the peeler 1 may have a spoon portion 15, fork portion 17 or a "spork" portion 18 respectively. More specifically, the peeler 1 may have the spoon portion 15, the fork portion 17 or the spork portion 18 at the first end 5 of the tab 2 and the handle 12 at the second end 6 of the tab 2. Further, the fork portion 17 and/or a "spork" portion 18 may have teeth 19 which may aid the user in eating the fruit 3.

The spoon portion 15, fork portion 17 or "spork" portion 18 may aid the user in eating the fruit 3 after the outer surface 11 of the fruit 3 is removed. The spoon portion 15, fork portion 17 or "spork" portion 18 may be manufactured as one piece with the peeler 1 or may be added and attached to the peeler 1 as a part through manufacturing or assembly through various processes known in the art. Further, the spoon portion 15, fork portion 17 or "spork" portion 18 may be manufactured and be made of the same materials as that of the tab 2 they may be composed of different materials molded as one piece into the tab 2 or otherwise attached to the tab 2 as multiple pieces.

Additionally, the spoon, fork and or spork can be flexible in all their variations, but they should be rigid enough for how they will be used. Additionally, the tab 2, the spoon portion 15, the fork portion 17, the spork portion 18, the cutting edge 21, the handle 12, the protective guard 23, which may be removable, disposable and reusable, of the peeler 1, may have a space 20 which may allow the manufacturer, farmer or other entity to place an advertisement or other indicia for a user's or an advertiser's purposes. A space 20 that can be utilized for advertising or for other indicia is depicted or illustrated in FIG. 4B where the space 20 may be on the tab 2 portion of the peeler 1. However, it should be noted that advertising or indicia may utilize and place this space 20 on other components of the peeler 1 such as upon the spoon portion 15, the fork portion 17, the spork portion 18, the cutting edge 21, the handle 12, the protective guard 23 or other parts of the peeler 1.

The tab 2 of the peeler 1 may also have a cutting edge 21. The cutting edge 21 may aid the user in cutting the fruit 3 before or after the outer surface 11 of the fruit 3 is removed. The cutting edge 21 may have a smooth blade or it may be serrated 22 or have ridges. In an embodiment, the cutting edge 21 may be stationary and non-moving and be part of the tab 2 and extend the length of the first side 7 and/or second side 8 of the tab 2. Alternatively, the cutting edge 21 may extend to only a portion of the first side 7 and/or second side 8 of the tab 2.

Embodiments illustrating a cutting edge 21 are shown in FIGS. 1B, 1C, 4A, 4B, 4C, 7 & 8, however it should be noted that any and all variations of the peeler 1 can be fashioned to have a cutting edge 21 as an optional feature and can be designed in a variety of ways. The cutting edge 21 may further have a protective guard 23 which may be removable, disposable, and or reusable which is shown in FIG. 4B. The protective guard 23, which may be removable, disposable, and or reusable, may reduce the risk of the user becoming injured from unintentional contact with the cutting edge 21. All variations of the peeler 1 can optionally have the cutting edge 21 covered with a protective guard 23 as is shown in FIG. 4B. The protective guard 23 should be removed from the cutting edge 21 prior to use of the cutting edge 21. The protective guard 23 may be made from any material, for example plastic, rubber, paper, metal or any other suitable material.

As depicted in FIG. 7, the peeler 1 may also have an axle 50 connecting the tab 2 to the cutting edge 21. More specifically, the axle 50 may allow the cutting edge 21 to rotate with respect to the tab 2. While the cutting edge 21 is in use, the cutting edge 21 may be rotated from a position substantially parallel to the tab 2 to a position substantially perpendicular to the tab 2 (or in a position substantially 180 degrees from the initial position of the cutting edge 21). FIG. 7 illustrates the cutting edge 21 in the process of being rotated between the substantially parallel position and the substantially perpendicular position. In an embodiment, when the cutting edge 21 is not in use, the cutting edge 21 may be secured under the bottom side 10 portion of the tab 2. Securing the cutting edge 21 under the bottom side 10 portion of the tab 2 may prevent injuries. If the user desires to use the cutting edge 21, the user may rotate the cutting edge 21, along the axle 50, to expose the cutting edge 21.

In alternate embodiments, the cutting edge 21 may be rotated on the axle 50 and secured into a hollowed-out portion of the tab, when not in use to prevent injuries, as in a pocket knife.

In a further alternate embodiment, the cutting edge 21 may be fashioned to mechanically adjust like a pocket knife to pivot or be rotated within the tab 2 on an axle 50 so as to move the cutting edge 21 into or out of a cutting position to be used as a cutting tool and or to be concealed when not in use as is shown in FIG. 7. Further, the cutting edge 21 may be made of the same materials as that of the tab 2 and molded as one piece with the tab or it may be composed of a metal blade or dissimilar materials and be inserted or be molded into the side of the tab 2 or be otherwise attached to tab 2 as multiple pieces. Additionally, the cutting edge can be flexible in all its variations, but should be rigid enough as well to withstand cutting pressures. Further still, in an alternate embodiment, the cutting edge 21 may mechanically slide into and out of a cutting position by moving on an axle 50 in a slot 51 to otherwise allow a user to mechanically adjust the cutting edge into and out of a cutting position as is shown in FIG. 8.

The peeler 1 may be added to the fruit 3 prior to being sold to consumers or the peeler 1 may be added to the fruit 3 by the consumer. If the peeler 1 is added to the fruit 3 by a consumer, the consumer may add the glue 4 to the tab 2 himself or herself, or the consumer may remove a protective sheet 25 from the tab 2, thereby exposing the glue 4 or other sticky surface of the tab 2 of peeler 1 (as is illustrated in FIG. 5). In an alternate embodiment, the peeler 1 may be activated by, for example, microwaves, light, heat, chemical(s), ultrasonic welding, or another process, that would cause the material of the tab 2 to become fused to the outside surface 11 of a fruit 3 and then be applied to the outside surface 11 or peel of a fruit 3. The peeler 1 may then fuse with the fruit 3 and eliminate the need for the glue 4 or other adhesive material in this fusing process. Alternatively, the peeler 1 may be affixed and fastened to a fruit 3 by activating a process oriented reactive glue that is otherwise not sticky or tactile until a process causes the glue to become sticky.

In this scenario, a reactive-glue would be either embedded in the tab 2 material or coated on the bottom 10 portion of the tab 2 that would be sensitive to heat, microwaves, U.V. light, chemicals, a liquid or solution, or another process would be used to activate the glue and make it sticky. A consumer or fruit packager would then apply the tab 2 to a fruit 3. A fruit packager may affix the bottom 10 of tab 2 of the peeler 1 to fruit 3 by these methods through automated means or by manual labor as well.

Referring now to FIG. 6, in an embodiment, the handle 12 is located substantially within the middle of the tab 2. In this embodiment, the user grabs the handle 12 and pulls upward. The tab 2 is then removed from the fruit 3 with the upward force coming from substantially the center of the tab 2. It should be noted that in alternate embodiments, the handle 12 can be placed at different locations with respect to the tab 2. Additionally, the tab 2 may be offered in different shapes and sizes. Further, it is contemplated that a peeler 1 can be constructed without a handle 12 whereby a consumer just pulls the peeler 1 off the fruit 3 by pulling on the tab 2.

Referring now to FIG. 7, the peeler 1 is shown removed from the fruit 3 exposing the flesh 24 of the fruit 3 after having torn off a portion of the outer surface 11 of the fruit 3. The peeler 1 is shown having a glued portion of the outer surface 11 (or the peel) of the fruit 3 remaining attached to the tab 2. The peeler 1 is also revealing a portion of the exposed flesh 24 of the fruit 3 that was peeled. It should be noted that the portion of the outer surface 11 (or the peel) of the fruit 3 which is removed from the fruit 3 after the peeler was used to tear off the outer surface 11 (or the peel) of the fruit 3 may be approximately the size of the tab 2 that is glued to the fruit peeling apparatus or the peeler 1.

Clearly this innovation has many advantages offering consumers at home or on the run a way to enjoy edible whole fresh fruits with added convenience making home snacking and making mobile lunches especially convenient by attaching a tab offering these described advantages and will probably increase the eating of fruit. This will make everyday fruit eating, school and business lunches much more convenient, not to mention picnics, church and town events, sporting events, vacations, being on the road, and other events much more enjoyable offering utilitarian advantages that will be enjoyed by all.

As to a further discussion of the manner and usage and operation of the present invention, the same should be apparent from the above description. Accordingly, no further discussion relating to the manner and usage and operation will be provided.

With respect to the above description then, it is to be realized that the optimum dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A combination fruit peeling apparatus and a fruit comprising: a fruit; and a fruit peeling apparatus having a substantially flat tab portion having a first side, a second side, a first end, a second end, a top side and a bottom side; a handle portion attached to the tab portion; an adhesive secured to the bottom side of the tab portion wherein the adhesive secures the tab portion to an outer surface of the fruit and wherein removal of the tab portion from the fruit results in removal of a portion of the fruit and a cutting edge on the tab portion of the fruit peeling apparatus wherein the cutting edge may cut the fruit upon removal of the apparatus from the fruit.

2. apparatus of claim 1 further comprising: a cutting edge on the tab portion wherein the cutting edge cuts the fruit.

3. The apparatus of claim 2 further comprising: a protective guard secured onto the cutting edge.

4. The apparatus of claim 2 further comprising: a serrated blade on the cutting edge.

5. The apparatus of claim 2 wherein the cutting edge is a stationary non-moving part of the tab portion.

6. The apparatus of claim 2 further comprising: an axle connecting the tab portion to the cutting edge wherein the cutting edge rotates with respect to the tab portion.

7. The apparatus of claim 2 further comprising: an axle connecting the tab portion to the cutting edge wherein the cutting edge slides in a slot with respect to the tab portion.

8. The apparatus of claim 2 wherein the cutting edge may be removed from the tab portion.

9. The apparatus of claim 2 further comprising: a protective guard secured onto the cutting edge wherein the protective guard is removed from the cutting edge prior to using the cutting edge.

10. The apparatus of claim 1 further comprising: a spoon feature attached to the tab.

11. The apparatus of claim 1 further comprising: a fork feature attached to the tab.

12. The apparatus of claim 1 further comprising: a spork feature attached to the tab.

13. The apparatus of claim 1 further comprising: a protective sheet over the adhesive wherein the protective sheet is removed from the bottom side of the tab prior to placing the tab onto the fruit.

14. The apparatus of claim 1 wherein the handle portion is located substantially in the center of the tab portion.

15. The apparatus of claim 1 wherein the handle portion is located substantially at the first end of the tab.

16. The apparatus of claim 1 wherein the handle portion is a ring.

17. The apparatus of claim 1 wherein the tab portion covers only a portion of the fruit.

18. The apparatus of claim 1 wherein the tab portion substantially wrap around the fruit.

19. The apparatus of claim 1 wherein the tab portion is flexible.

20. The apparatus of claim 1 wherein the adhesive is added to the tab portion or fruit immediately prior to utilization of the peeling apparatus.

21. The apparatus of claim 1 wherein waxes, cleansing agents, dyes, fruit gases, fruit sugars, organic materials, inorganic materials, and fruit juices can be located between the tab portion and the outer surface of a fruit wherein the adhesive utilized by the tab portion will allow it to adhere to the outside surface of the fruit despite the presence of said substances.

22. The apparatus of claim 1 wherein the tab portion utilizes an adhesive that is formnulated so that adhesive properties are not negatively affected when the tab portion is glued to the outside surface of the fruit.

23. The apparatus of claim 1 wherein the fruit peeling apparatus utilizes an adhesive that is formulated to have the bonding strength required to tear off the outside surface of a fruit that the tab portion is glued to, when a consumer pulls the glued tab portion off the fruit.

24. The apparatus of claim 1 wherein the adhesive utilized by the fruit peeling apparatus is resistant to temperature and moisture changes.

25. The apparatus of claim 1 wherein the portion of the fruit removed is substantially the same size as the tab portion.

26. The apparatus of claim 1 wherein the tab portion utilized by the fruit peeling apparatus is fused to a fruit by processes such as microwaves, light, heat, chemicals, ultrasonic welding, or another process that would cause the material of the tab portion to fuse or to adhere to the outside surface or the peel of a fruit in the absence of an adhesive.

27. The apparatus of claim 1 further comprising: a space on the tab portion for indicia.

* * * * *